(12) United States Patent
Anglin

(10) Patent No.: US 10,221,937 B2
(45) Date of Patent: Mar. 5, 2019

(54) SLOTTED OIL BAFFLE FOR GEARS

(71) Applicant: United Technologies Corporation, Hartford, CT (US)

(72) Inventor: Christopher T. Anglin, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 321 days.

(21) Appl. No.: 15/091,149

(22) Filed: Apr. 5, 2016

(65) Prior Publication Data
US 2017/0284534 A1  Oct. 5, 2017

(51) Int. Cl.
| F16H 57/04 | (2010.01) |
|---|---|
| F02C 7/32 | (2006.01) |
| F16H 1/14 | (2006.01) |
| F02C 7/36 | (2006.01) |
| F16H 57/12 | (2006.01) |

(52) U.S. Cl.
CPC ........... *F16H 57/0423* (2013.01); *F02C 7/32* (2013.01); *F02C 7/36* (2013.01); *F16H 1/14* (2013.01); *F16H 57/12* (2013.01); *F05D 2260/4031* (2013.01); *F05D 2260/98* (2013.01)

(58) Field of Classification Search
CPC .................................................. F16H 57/0423
See application file for complete search history.

(56) References Cited

U.S. PATENT DOCUMENTS

| 2,017,871 A * | 10/1935 | Strain ................. F16H 57/0463 184/109 |
|---|---|---|
| 3,942,387 A | 3/1976 | Stone et al. |
| 4,667,774 A | 5/1987 | Roberge |
| 6,467,578 B1 * | 10/2002 | Winfree .............. F16H 57/0456 184/6.12 |
| 7,341,426 B2 | 3/2008 | Schwarz et al. |
| 7,386,983 B2 | 6/2008 | Miller |
| 7,500,365 B2 | 3/2009 | Suciu et al. |
| 7,971,507 B2 * | 7/2011 | Swainson ........... F16H 57/0434 57/434 |
| 7,984,791 B2 | 7/2011 | Taguchi et al. |

(Continued)

FOREIGN PATENT DOCUMENTS

| EP | 1610036 A2 | 12/2005 |
|---|---|---|
| GB | 2223819 A | 4/1990 |

OTHER PUBLICATIONS

Extended European Search Report for EP Application No. 17208638.1, dated May 25, 2018, 7 Pages.

*Primary Examiner* — Terence Boes
(74) *Attorney, Agent, or Firm* — Kinney & Lange, P.A.

(57) ABSTRACT

A baffle for use with one or both bevel gears in a transmission system is disclosed that can include a rim having a frustoconical shape, multiple pockets on an inner side of the rim configured to collect lubricant, and multiple slots extending through the rim with each slot of the multiple slots being adjacent to a corresponding pocket of the multiple pockets and configured to allow lubricant to flow through the rim. A transmission system is also disclosed that can include a first gear, a second gear, and a baffle surrounding gear teeth of the first or second gear. The baffle has a plurality of pockets adjacent to the gear teeth and a plurality of slots adjacent to the plurality of pockets with the plurality of slots extending through the baffle.

20 Claims, 9 Drawing Sheets

(56) References Cited

U.S. PATENT DOCUMENTS

| | | | |
|---|---|---|---|
| 8,011,883 B2 | 9/2011 | Schwarz et al. | |
| 8,333,678 B2 | 12/2012 | McCune | |
| 8,585,538 B2 | 11/2013 | Sheridan et al. | |
| 8,919,134 B2 | 12/2014 | Tatman et al. | |
| 8,973,465 B2 | 3/2015 | Duong | |
| 9,068,515 B2 | 6/2015 | Duong et al. | |
| 9,074,681 B2 | 7/2015 | Hanlon et al. | |
| 9,115,650 B2 | 8/2015 | McCune et al. | |
| 9,810,311 B1 | 11/2017 | Zhang et al. | |
| 9,989,143 B2 * | 6/2018 | Fomison | F16H 57/0409 |
| 2006/0048600 A1 * | 3/2006 | Taguchi | F16H 57/0483 |
| | | | 74/607 |
| 2008/0236951 A1 | 10/2008 | Alecu et al. | |
| 2009/0314580 A1 | 12/2009 | Jabs et al. | |
| 2010/0038174 A1 * | 2/2010 | Mordukhovich | F16H 57/0413 |
| | | | 184/6.12 |
| 2010/0140019 A1 * | 6/2010 | Imai | F16H 57/0493 |
| | | | 184/6.12 |
| 2014/0064930 A1 * | 3/2014 | NguyenLoc | F01D 15/12 |
| | | | 415/122.1 |
| 2014/0169941 A1 | 6/2014 | DiBenedetto et al. | |
| 2015/0097073 A1 | 4/2015 | McPeak et al. | |
| 2016/0230875 A1 * | 8/2016 | Pankratov | F16H 57/0423 |
| 2017/0146112 A1 | 5/2017 | Anglin et al. | |
| 2018/0023684 A1 | 1/2018 | Anglin | |
| 2018/0149260 A1 | 5/2018 | Singh et al. | |

\* cited by examiner

SLOTTED OIL BAFFLE FOR GEARS

BACKGROUND

The present disclosure relates to a transmission system and more particularly, to a baffle for meshing gears in a mid-bearing compartment.

An engine may include a transmission system for coupling one of its spools to an accessory gearbox. This transmission system may include a first bevel gear (often called the bull gear) mounted to a shaft of the spool. The transmission system also includes a tower shaft and an associated second bevel gear (often just called the bevel gear) mounted to a first end of the tower shaft, where a second end of the tower shaft is coupled to the accessory gearbox. The transmission system may also include a baffle configured to cover at least a portion of the bevel gear. Such a baffle is provided so as to prevent surplus lubricant churning within the mid-bearing compartment in which the transmission system is located from impinging on that portion of the bevel gear since such surplus lubricant impingement may increase windage and impingement (e.g., fluid drag) on the bevel gear. However, such a baffle may also capture lubricant which is propelled off of the bevel gear. This captured lubricant may churn within the space between the bevel gear and the baffle and thereby cause windage and impingement on the bevel gear.

SUMMARY

A transmission system for use in a mid-bearing compartment can include a first gear with a first set of gear teeth, a second gear with a second set of gear teeth that mesh with the first set of gear teeth, and a baffle surrounding a subset of the second set of gear teeth. The baffle has a plurality of pockets adjacent to the subset of the second set of gear teeth and a plurality of slots adjacent to the plurality of pockets with the plurality of slots extending through the baffle.

A baffle for use in a transmission system can include a rim having a frustoconical shape, multiple pockets on an inner side of the rim configured to collect lubricant, and multiple slots extending through the rim with each slot of the multiple slots being adjacent to a corresponding pocket of the multiple pockets and configured to allow lubricant to flow through the rim.

DETAILED DESCRIPTION

A baffle with a plurality of slots and a plurality of pockets is discloses herein that is configured to surround a bevel gear in a transmission system and shield that bevel gear from impingement caused by lubricant churning or otherwise moving around a mid-bearing compartment in which the bevel gear is located. Further, the plurality of slots and the plurality of pockets in the baffle are configured to allow lubricant that is trapped between the bevel gear and an inner side of the baffle to be collected (in the plurality of pockets) and escape (through the plurality of slots), further reducing impingement on the bevel gear. The reduction of impingement and the reduction of churning of lubricant surrounding the bevel gear increases efficiency of a gas turbine engine in which the transmission system is a part of because such motion of the lubricant causes the lubricant to increase in temperature, resulting in the gas turbine engine expending more energy operating heat exchangers to reduce the temperature of the lubricant before the lubricant is recycled through the gas turbine engine. Also, impingement and churning of lubricant on the bevel gear reduces the rotational efficiency of the bevel gear (and thus reduces the efficiency of the gas turbine engine) because the bevel gear faces increased resistance from lubricant that is impacting the bevel gear. Thus, the presence of the plurality of slots and the plurality of pockets in the baffle is beneficial to allow lubricant to be removed from the bevel gear. The number, size, and shape of the plurality of slots and the plurality of pockets can be varied depending on design considerations and the amount of lubricant within the mid-bearing compartment and in the space between the bevel gear and the baffle.

Figure 1:
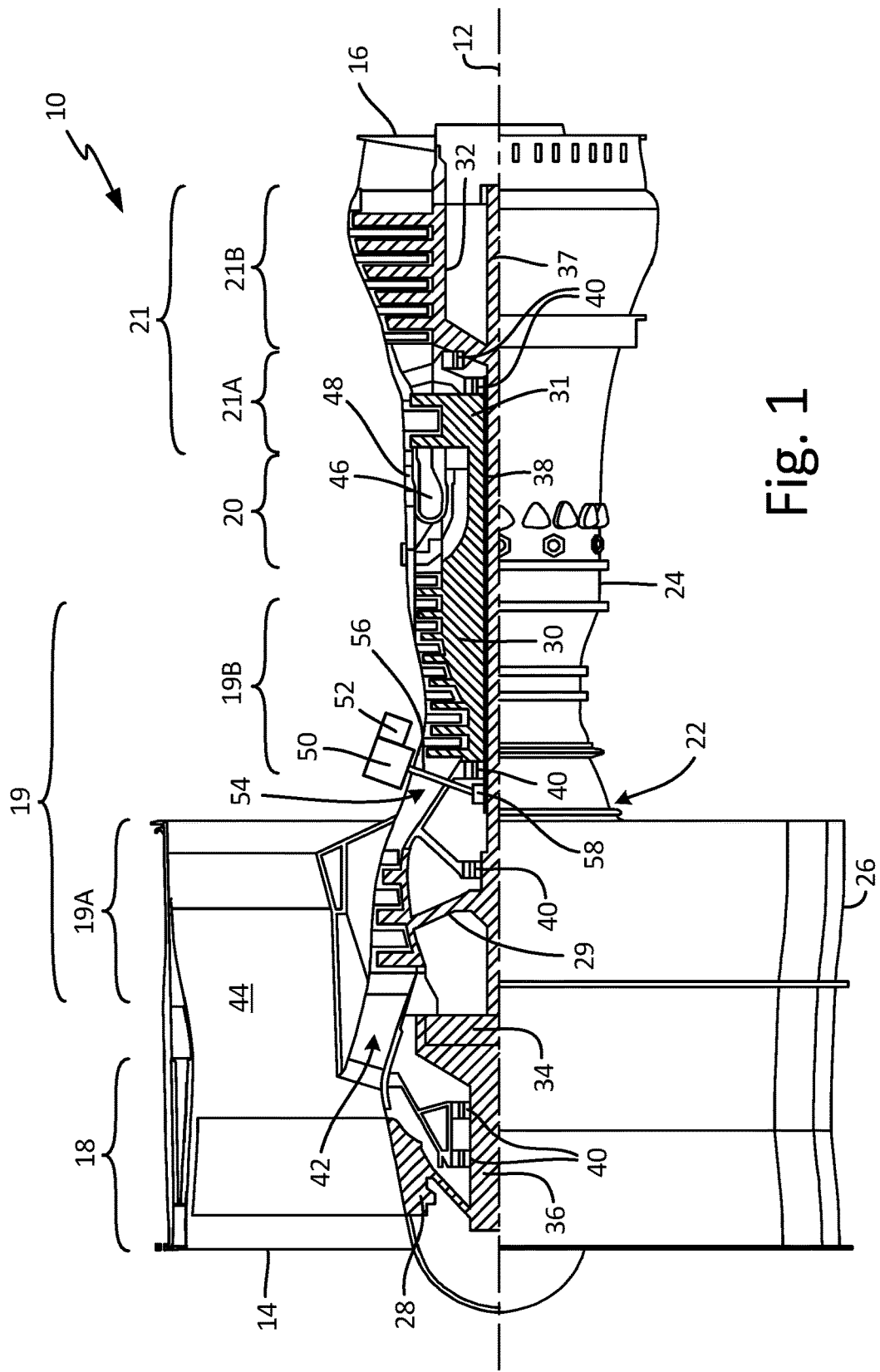
FIG. 1 is a side elevation cutaway view of a gas turbine engine.

FIG. 1 is a side elevation cutaway view of gas turbine engine 10, which is shown as a turbofan engine for an aircraft propulsion system. Gas turbine engine 10 extends along axial centerline 12 between upstream airflow inlet 14 and downstream airflow exhaust 16.

Gas turbine engine 10 includes fan section 18, compressor section 19, combustor section 20, and turbine section 21. Compressor section 19 includes low pressure compressor ("LPC") section 19A and high pressure compressor ("HPC") section 19B. Turbine section 21 includes high pressure turbine ("HPT") section 21A and low pressure turbine ("LPT") section 21B.

Fan section 18, compressor section 19, combustor section 20, and turbine section 21 are arranged sequentially along centerline 12 within engine housing 22. Engine housing 22 includes inner case 24 (e.g., a core case) and outer case 26 (e.g., a fan case). Inner case 24 may house one or more of fan section 18, compressor 19, combustor section 20, and turbine section 21 (e.g., an engine core). Outer case 26 may house at least fan section 18.

Each of gas turbine engine sections 18, 19A, 19B, 21A and 21B includes respective rotors 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 28 is connected to gear train 34, for example, through fan shaft 36. Gear train 34 and LPC rotor 29 are connected to and driven by LPT rotor 32 through low speed shaft 37. The combination of at least LPC rotor 29, LPT rotor 32, and low speed shaft 37 may be referred to as "a low speed spool." HPC rotor 30 is connected to and driven by HPT rotor 31 through high speed shaft 38. The combination of at least HPC rotor 30, HPT rotor 31, and high speed shaft 38 may be referred to as "a high speed spool." Shafts 36-38 are rotatably supported by a plurality of bearings 40, which can be rolling element bearings, thrust bearings, or other types of bearings. Each of these bearings 40 is connected to engine housing 22 by at least one stationary structure such as, for example, an annular support strut.

During operation, air enters gas turbine engine 10 through airflow inlet 14. Air is directed through fan section 18 and is then split into either core gas path 42 or bypass gas path 44. Core gas path 42 flows sequentially through fan section 18, compressor section 19, combustor section 20, and turbine section 21. The air within core gas path 42 may be referred to as "core air." Bypass gas path 44 flows through a duct between inner case 24 and outer case 26. The air within bypass gas path 44 may be referred to as "bypass air."

The core air is compressed by LPC rotor 29 and HPC rotor 30 and directed into combustion chamber 46 of combustor 48 in combustor section 20. Fuel is injected into combustion chamber 46 and mixed with the core air that has been compressed by compressor section 19 to provide a fuel-air mixture. This fuel-air mixture is ignited and combustion products thereof expand and flow through and sequentially cause HPT rotor 31 and LPT rotor 32 to rotate. The rotation of HPT rotor 31 and LPT rotor 32 respectively drive rotation of LPC rotor 29 and HPC rotor 30 and compression of the air received from core gas path 42. The rotation of LPT rotor 32 also drives rotation of fan rotor 28, which propels bypass air through and out of bypass gas path 44. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 50, one or more gearbox attachments 52 and transmission system 54 in a mid-bearing compartment between LPC section 19A and HPC section 19B. Accessory gearbox 50 is mounted to inner case 24. However, in alternative embodiments, accessory gearbox 50 may be mounted elsewhere with gas turbine engine 10, such as to outer case 26. Accessory gearbox 50 is configured to transfer rotational energy (e.g., torque) between transmission system 54 and the one or more gearbox attachments 52. An example of an accessory gearbox is disclosed in U.S. Pat. No. 9,068,515 to Duong et al., which is assigned to the assignee of the present disclosure. Examples of a gearbox attachment may include an air turbine starter, a deoiler, a hydraulic pump, an oil pump, an integrated drive generator, a permanent magnet alternator and a fuel pump module. Of course, the present disclosure is not limited to including the foregoing exemplary types or configurations of accessory gearbox 50 or gearbox attachments 52.

Transmission system 54 is configured to mechanically couple and thereby transfer rotational energy (e.g., torque) between a rotating assembly (or component) of gas turbine engine 10 and accessory gearbox 50. In particular, transmission system 54 of FIG. 1 mechanically couples one of the low speed spool or high speed spool of gas turbine engine 10 to the accessory gearbox 50. This transmission system 54 includes high speed shaft 38, tower shaft 56, and geared system 58, which is shown in greater detail in FIG. 2.

Figure 2:
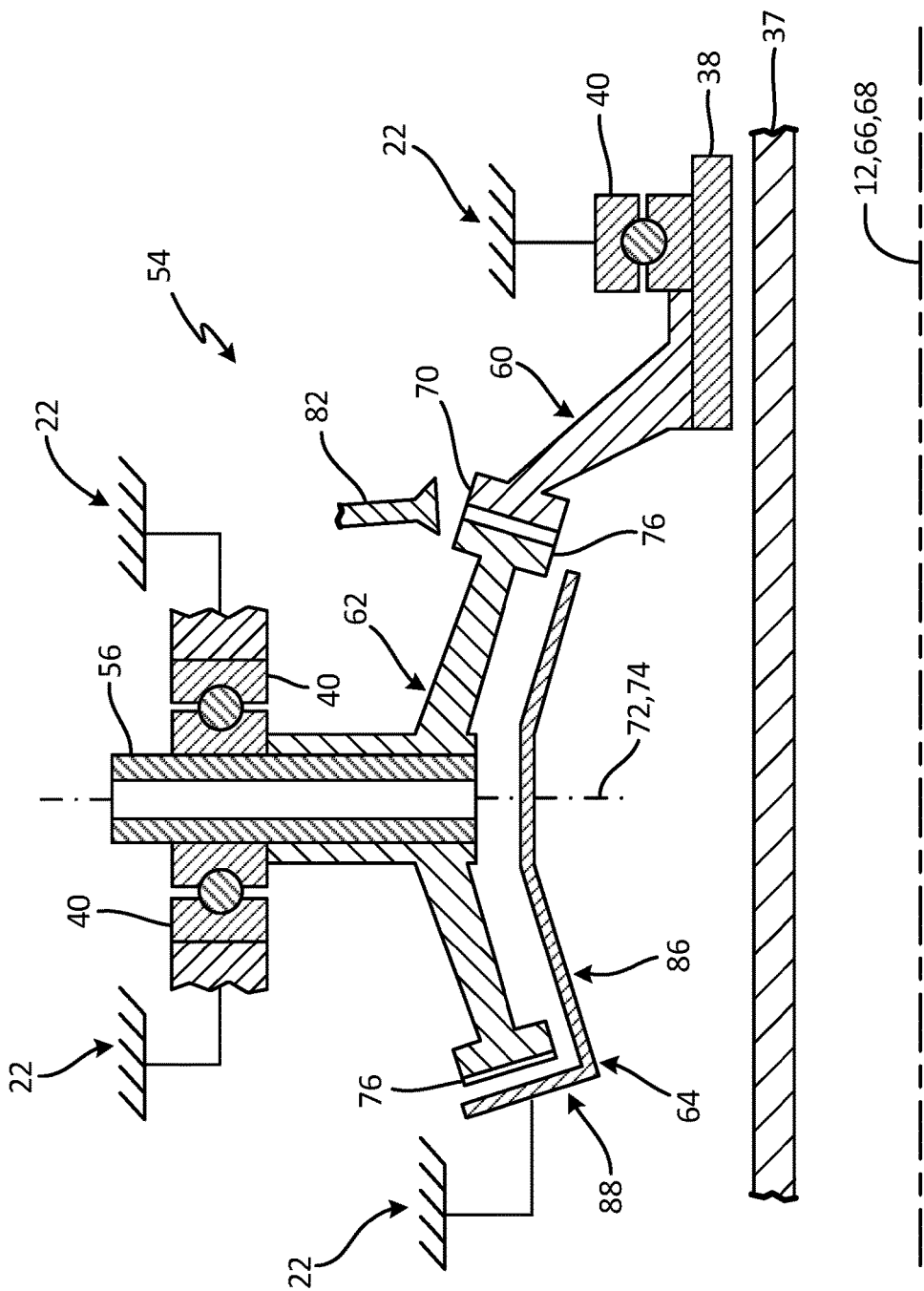
FIG. 2 is a side sectional schematic of a transmission system.
Figure 3:
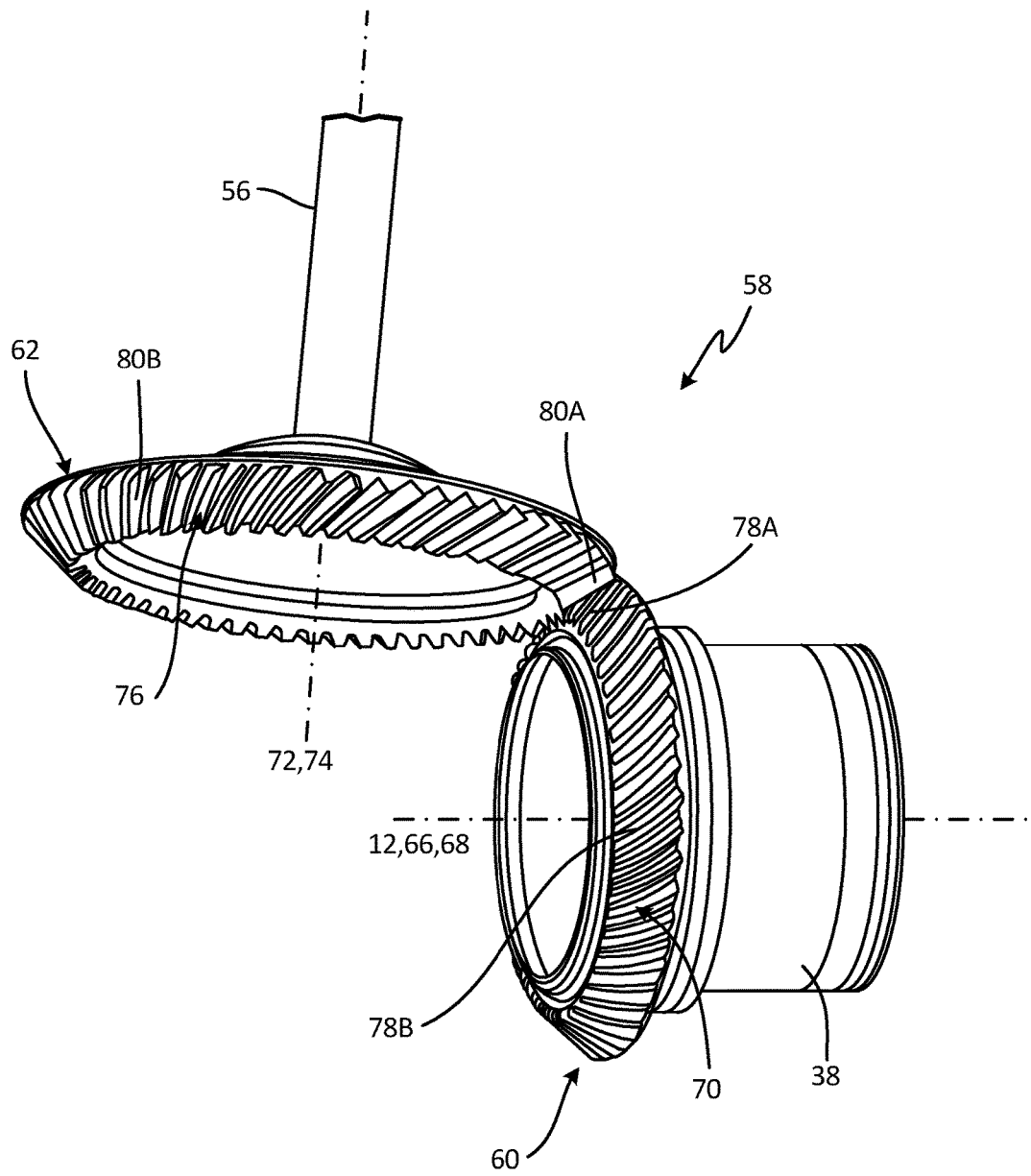
FIG. 3 is a perspective view of a geared system in the transmission system.
Figure 4:
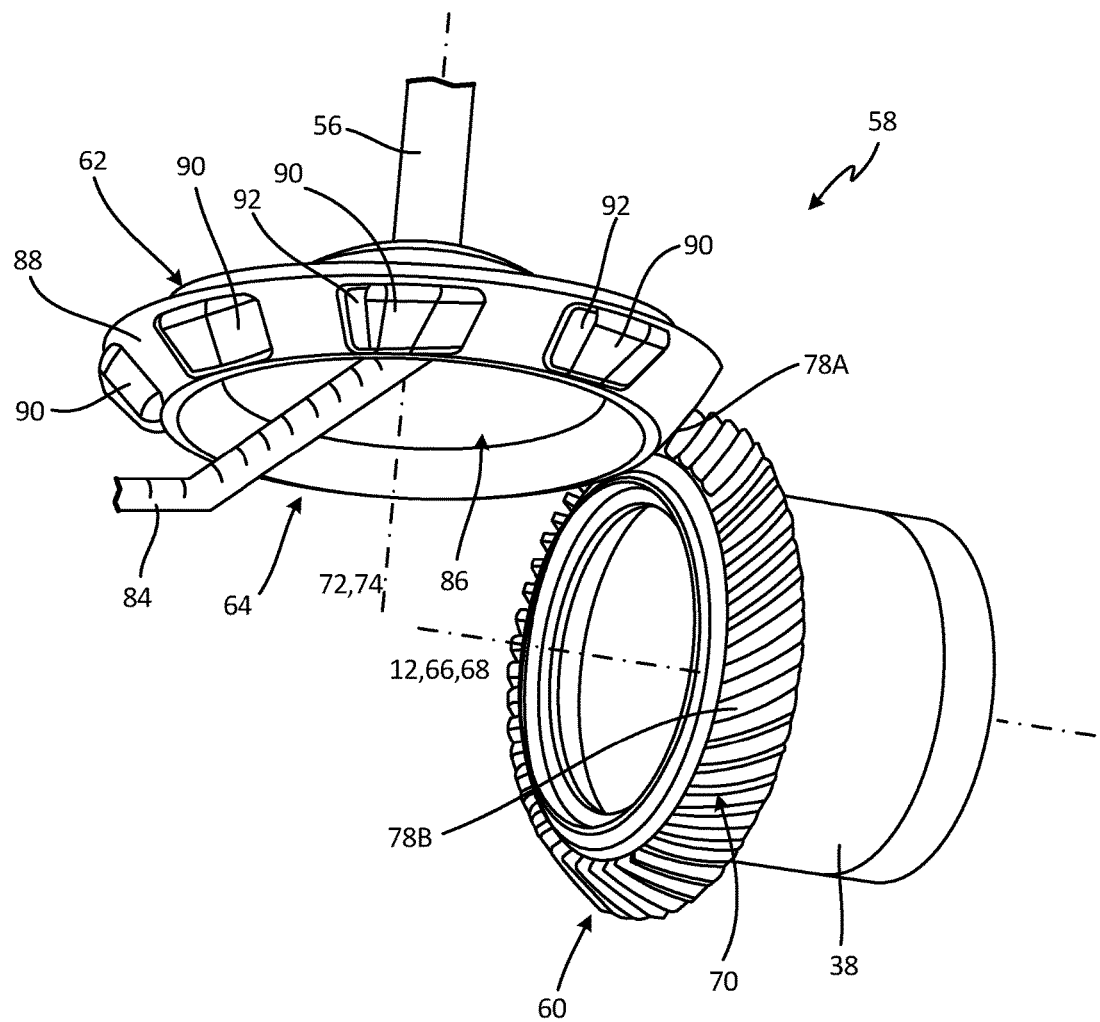
FIG. 4 is a perspective view of the gear system with a baffle.

FIG. 2 is a side sectional schematic of transmission system 54, FIG. 3 is a perspective view of geared system 58 in transmission system 54, and FIG. 4 is a perspective view of geared system 58 with baffle 64. Transmission system 54 is within a mid-bearing compartment and includes geared system 58, which contains first gear 60, second gear 62, and baffle 64. FIG. 2 shows high speed shaft 38 adjacent to low speed shaft 37 on a radially inner side and to bearing 40 and first gear 60 on a radially outer side. In turn, bearing 40 is connected to engine housing 22. First gear 60 of FIG. 2 is configured as a bevel gear and, in particular, a bull gear. First gear 60 is mounted to high speed shaft 38, for example, by a splined interface. First gear 60 rotates around rotational axis 66, which is coaxial with rotational axis 68 of low speed shaft 37 and centerline 12. FIG. 2 also shows tower shaft 56 connected to second gear 62 and held in place by bearings 40 connected to engine housing 22. Second gear 62 of FIG. 2 is configured as a bevel gear and is mounted to tower shaft 56, for example, by a splined interface. Second gear 62 rotates around rotational axis 72, which is coaxial with rotational axis 74 of tower shaft 56. Rotational axis 72 is arranged coincident with and at least generally (e.g., within plus or minus one or two degrees) perpendicular to the rotational axis 66 of first gear 60. However, in other embodiments, the rotational axis 72 of second gear 62 may be arranged coincident with and acutely or obtusely angled to the rotational axis 66 of first gear 60. Nozzle 82 provides lubricant, such as oil, to first gear 60 and second gear 62 to cool and reduce friction between first gear 60 and second gear 62.

Shown in FIG. 3, first gear 60 includes first set of gear teeth 70, with first set of gear teeth 70 having first meshed subset 78A and first unmeshed subset 78B. Second gear 62 includes second set of gear teeth 76, with second set of gear teeth 76 having second meshed subset 80A and second unmeshed subset 80B. Second meshed subset 80A meshes and engages with first meshed subset 78A of first set of gear teeth 70 to transfer torque between high speed shaft 38 and tower shaft 56. The configuration of first gear 60, second gear 62, and their components and how they interact with one another is generally understood in the art.

First set of gear teeth 70 of first gear 60 is arranged in a circumferential array, which extends circumferentially around rotational axis 66. First set of gear teeth 70 is configured to provide first gear 60 with an annular, conically-shaped pitch surface. First set of gear teeth 70 is further configured to provide first gear 60 with a spiral (or helical) bevel gear configuration. However, in other embodiments, first set of gear teeth 70 may be configured to provide first gear 60 with a straight bevel gear configuration, a Zerol® bevel gear configuration, a hypoid bevel gear configuration, a double spiral (or helical) bevel gear configuration, or another type of bevel gear configuration. The present disclosure, of course, is not limited to the foregoing exemplary first gear 60 types or configurations.

Second set of gear teeth 76 of second gear 62 is arranged in a circumferential array, which extends circumferentially around rotational axis 72. Second set of gear teeth 76 is configured to provide second gear 62 with an annular, conically shaped pitch surface. Second set of gear teeth 76 are further configured to provide second gear 62 with a spiral (or helical) bevel gear configuration. However, in other embodiments, second set of gear teeth 76 may be configured to provide second gear 62 with a straight bevel gear configuration, a Zerol® bevel gear configuration, a hypoid bevel gear configuration a double spiral (or helical) bevel gear configuration, or another type of bevel gear configuration. The present disclosure, of course, is not limited to the foregoing exemplary second gear 62 types or configurations.

Second set of gear teeth 76 of second gear 62 is meshed (i.e., mated and engaged) with first set of gear teeth 70 of first gear 60. In particular, first meshed subset 78A of first set of gear teeth 70 are meshed with second meshed subset 80A of second set of gear teeth 76, where each of first meshed subset 78A and second meshed subset 80A includes a plurality of gear teeth. With the foregoing meshed configuration, first set of gear teeth 70 also includes first unmeshed subset 78B, which is a subset of gear teeth that are not meshed and are disengaged from second set of gear teeth 76, and second set of gear teeth 76 includes second unmeshed subset 80B, which is a subset of second set of gear teeth 76 that is not meshed and is disengaged from first set of gear teeth 70. The specific gear teeth in each of first set of gear teeth 70 and second set of gear teeth 76 will change as the respective first gear 60 and second gear 62 rotate about their respective rotational axes.

Shown in FIGS. 2 and 4, baffle 64 is arranged with (i.e., positioned next to and in close proximity with) second gear 62 so as to surround and cover a region of second gear 62 as described below in further detail. Baffle 64 is connected to arm 84, which is attached to engine housing 22 to keep baffle 64 stationary, and thereby remains stationary as second gear 62 rotates about rotational axis 72. Arm 84 can be any type of support that attaches at one end to baffle 64 and at another to engine housing 22. However, arm 84 should be configured so as to not interfere with other components within the mid-bearing compartment, such as low speed shaft 37 and/or high speed shaft 38 that may extend through first gear 60 adjacent to second gear 62, as shown in FIG. 2.

Figure 5A:
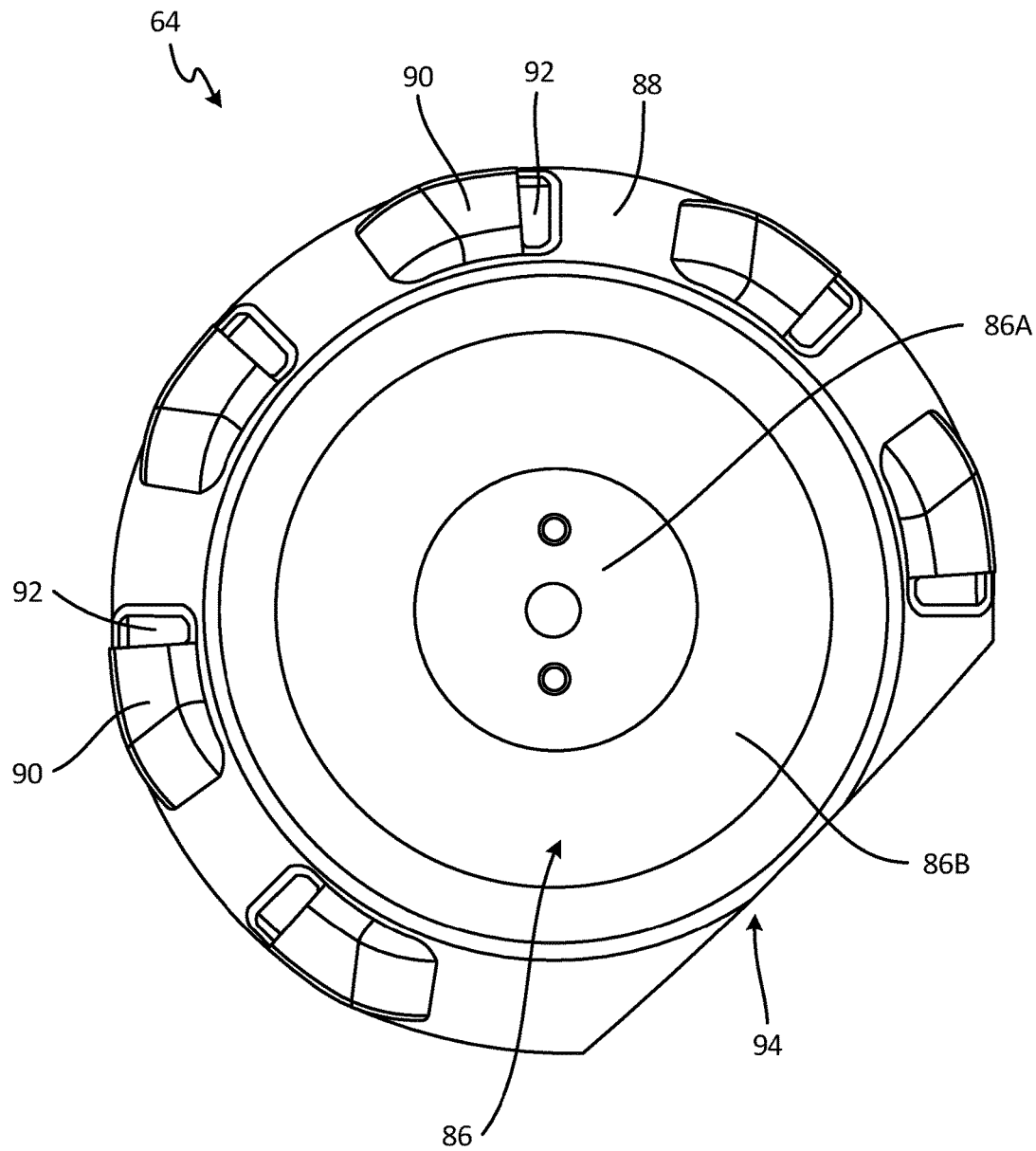
FIG. 5A is a bottom plan view of the baffle.
Figure 5B:
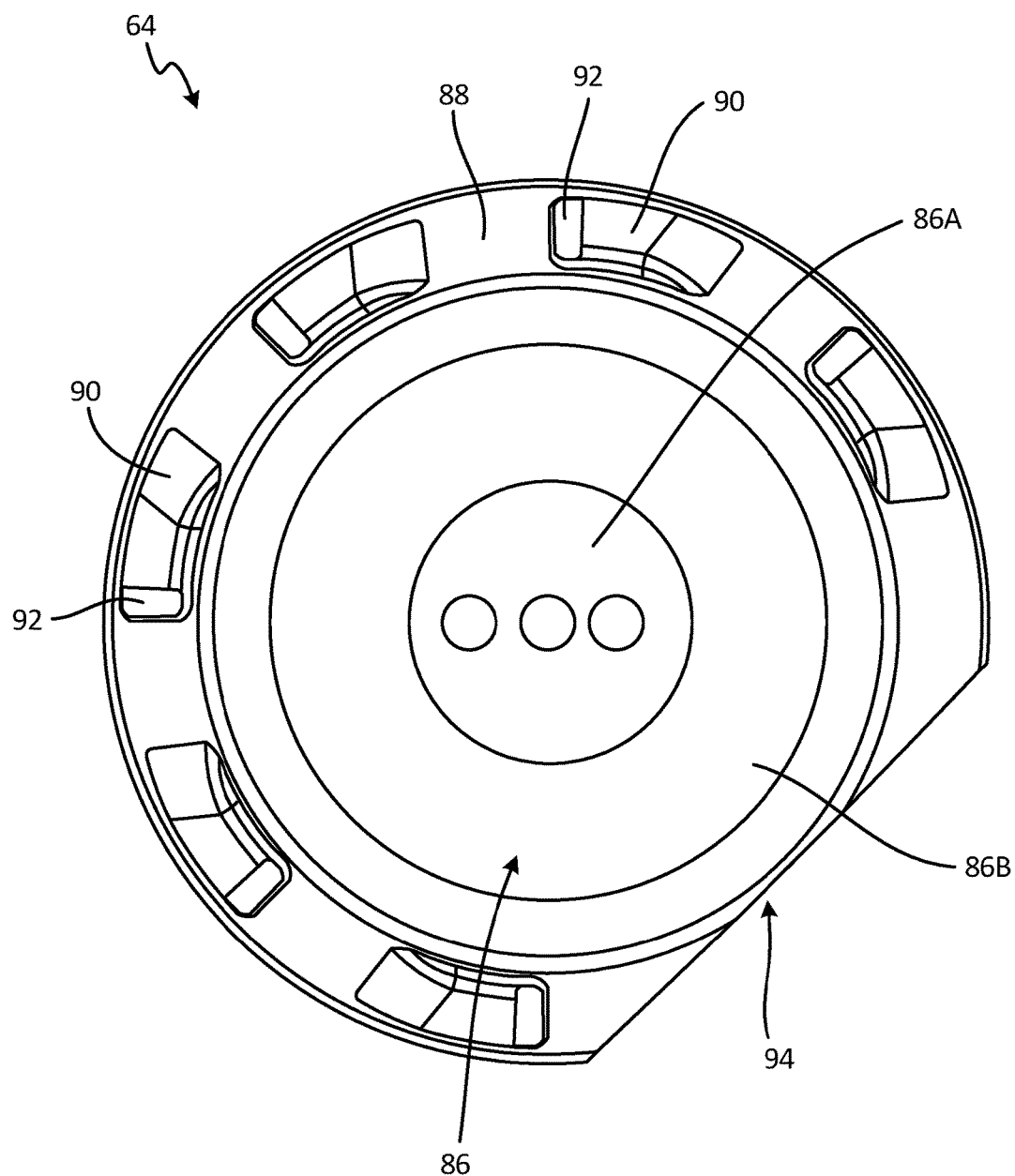
FIG. 5B is a top plan view of the baffle.
Figure 5C:
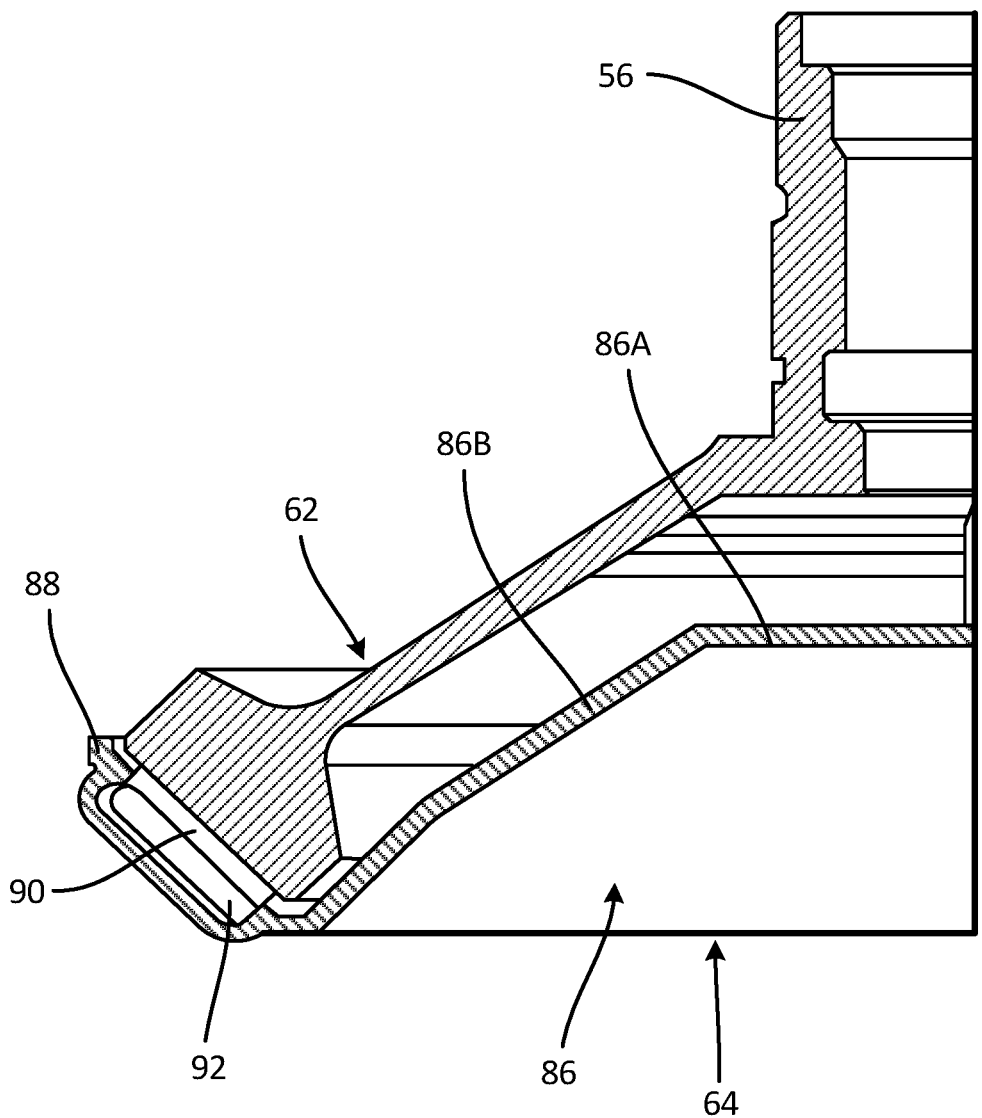
FIG. 5C is a cross-sectional elevation view of an interior side of the baffle.

As shown in FIGS. 5A, 5B, and 5C; which are a bottom plan view, a top plan view, and a cross-sectional elevation view of baffle 64; baffle 64 includes disk 86 (also referred to as a frustoconical portion) and rim 88 (also referred to as a cover), with rim 88 including a plurality of pockets 90 and a plurality of slots 92. Disk 86 includes flat portion 86A and angled portion 86B. Rim 88 also includes window 94, which is a cut-out of rim 88 adjacent to an area where first gear 60 meshes with second gear 62.

Disk 86 is a radially interior portion of baffle 64 that is connected to and radially inward from rim 88. Disk 86 includes two regions: flat portion 86A and angled portion 86B. Angled portion 86B has a hollow frustoconical shape that is connected to and radially inward from rim 88, and flat portion 86A has a circular shape that is connected to and radially inward from angled portion 86B. Flat portion 86A can have an attachment area configured to allow baffle 64 to attach to a support structure, such as arm 84. While disk 86 is shown with flat portion 86A and angled portion 86B, disk 86 can be flat such that the entirety of disk 86 is in one plane, or can be another shape, such as semispherical or generally conical. Disk 86 can have a shape that is similar to an inner side of second gear 62, as is shown in FIG. 5C, to more closely surround second gear 62. The attachment area on flat portion 86A can have one or multiple holes that are configured to accommodate bolts, rivets, or other fasteners or can have other attachment means, such as ridges, mounds, or a surface that is able to be welded, brazed, and/or glued. Further, as will be described in regards to FIGS. 6A and 6B, baffle 64 does not need to include disk 86 and rather can have a ring with an aperture in a middle of baffle 64 that allows for a shaft or another component to extend through baffle 64.

Rim 88 is radially outward from disk 86 (from angled portion 86B) and can be a frustoconical shape that surrounds second unmeshed subset 80B. Rim 88 is configured to cover second unmeshed subset 80B of second set of gear teeth 76. Rim 88 has window 94 adjacent to the area where second gear 62 meshes with first gear 60 so that rim 88 does not cover second meshed subset 80A of second set of gear teeth 76 (i.e., leaves second meshed subset 80A uncovered and exposed so as to be able to mesh with first meshed subset 78A without rim 88 contacting first gear 60). In this manner, rim 88 is operable to enable a lubricant system, such as nozzle 82 shown in FIG. 2, to direct lubricant onto first set of gear teeth 70 and/or second set of gear teeth 76 just prior to and/or at the area where those gear teeth mesh with one another (see FIG. 3).

Window 94 is a cut out of rim 88, with the portion shown in FIGS. 5A, 5B, and 5C shaped by a chord drawn between two points on a radially outer side of the circular rim 88 and removing the smaller portion so that window 94 has a straight side. While window 94 is shown to have a straight side with baffle 64, window 94 can have another configuration, such as a radially inwardly rounded side, a radially outwardly rounded side, a side having a stair-stepped shape, or a side having more than one radius of curvature. Window 94 is sized and shaped such that a portion of second gear 62 (the portion that includes second meshed subset 80A) may extend radially through window 94 and mesh with first gear 60. Window 94 is also sized and shaped to enable nozzle 82 to direct lubricant onto first set of gear teeth 70 and second set of gear teeth 76. However, rim 88 is operable to substantially prevent second unmeshed subset 80B of second set of gear teeth 76 from being impinged by or otherwise receiving additional lubricant that is churning or otherwise moving around the mid-bearing compartment in which transmission system 54 is located. Such additional lubricant, if allowed to impinge second unmeshed subset 80B of second set of gear teeth 76, may increase second gear 62 windage and thereby decrease efficiency of transmission system 54 and, thus, gas turbine engine 10 due to the contact between lubricant and second gear 62.

Disk 86 and rim 88 can be separate pieces connected to one another through various fastening means, including bolts, rivets, welds, brazing, glue, or another fastener. However, as shown in the disclosed embodiments, all components of baffle 64, including disk 86 and rim 88, can be one continuous and monolithic piece.

Rim 88 includes a plurality of pockets 90 and a plurality of slots 92 adjacent to the plurality of pockets 90. Each of the plurality of pockets 90 is an indent or depression on an inner side of rim 88 (i.e., adjacent second unmeshed subset 80B of second set of gear teeth 76). The plurality of pockets 90 are configured to collect lubricant that is expelled from second set of gear teeth 76 due to the rotation of second gear 62. The lubricant expelled from second set of gear teeth 76 is provided to second set of gear teeth 76 by nozzle 82 to cool second gear 62 and reduce friction between first meshed subset 78A and second meshed subset 80A. The lubricant that is collected in the plurality of pockets 90 can escape a space between second set of gear teeth 76 and the inner side of rim 88 through the plurality of slots 92.

Each of the plurality of slots 92 is adjacent to one of the plurality of pockets 90, and each of the plurality of pockets 90 and the plurality of slots 92 can be sized and shaped to allow a sufficient amount of lubricant to be collected and to escape the space between second set of gear teeth 76 and the inner side of rim 88. Also, the plurality of slots 92 are sized and shaped to prevent the lubricant churning or otherwise moving around the mid-bearing compartment from flowing in through the plurality of slots 92 to impinge second set of gear teeth 76. In the disclosed embodiments, the plurality of slots 92 each have an oblong shape with a side of each of the plurality of slots 92 coinciding with a side of one of the plurality of pockets 90. Each of the plurality of pockets 90 can be sized and shaped to collect a desired amount of lubricant expelled from second set of gear teeth 76 due to rotation of second gear 62, with each of the plurality of pockets 90 being upstream from a corresponding slot 92

(with upstream meaning rotationally upstream as measured by a rotation of second gear 62). However, each of the plurality of pockets 90 can be downstream from a corresponding slot 92 if design requires.

As shown in the disclosed embodiments, the plurality of pockets 90 are each a depression formed by a wall of rim 88 extending away from second gear 62 such that a distance between second set of gear teeth 76 and rim 88 is larger at the plurality of pockets 90 than a distance between second set of gear teeth 76 and the inner side of rim 88. Each of the plurality of pockets 90 can gradually get deeper the closer each pocket 90 gets to the corresponding slot 92 so that lubricant can easily flow out of the plurality of pockets 90 through the plurality of slots 92. However, each of the plurality of pockets 90 can have other configurations, such as a pocket that is rectangular with one consistent depth, a pocket that has a lip on the side of the pocket that is adjacent to the corresponding slot 92, a pocket that has channels on a bottom, or a pocket that has walls that gradually transition from rim 88 to the bottom of pocket 90. While the disclosed embodiments show the plurality of pockets 90 having a length (measured in a circumferential direction) that is greater than a length of a corresponding slot 92, each of the plurality of slots 92 can have a length that is greater than a length of a corresponding pocket 90. Further, each of the plurality of pockets 90 can have a different length than adjacent pockets 90. The disclosed embodiments show baffle 64 having six pockets 90 along with six slots 92, but other embodiments can include any number of pockets 90 and slots 92, depending on design considerations and the amount of lubricant applied to first gear 60 and second gear 62 and the amount of lubricant within the mid-bearing compartment in which transmission system 54 is located.

Without the plurality of pockets 90 and the plurality of slots 92 in baffle 64, lubricant is trapped in the space between second set of gear teeth 76 and the inner side of rim 88, increasing windage and impingement and thereby decrease efficiency of transmission system 54 and, thus, gas turbine engine 10.

Figure 6A:
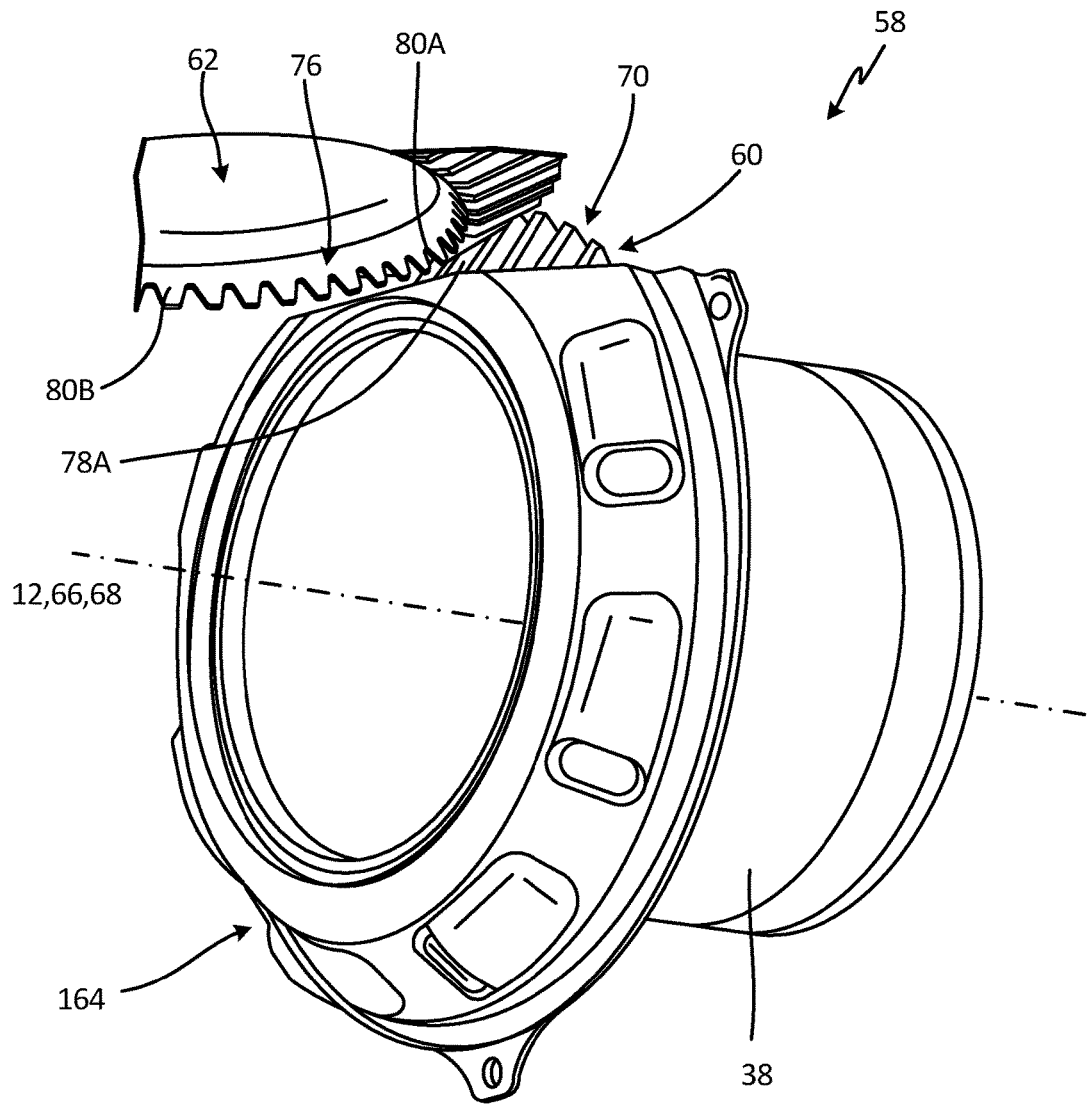
FIG. 6A is a perspective view of a geared system with another embodiment of a baffle.
Figure 6B:
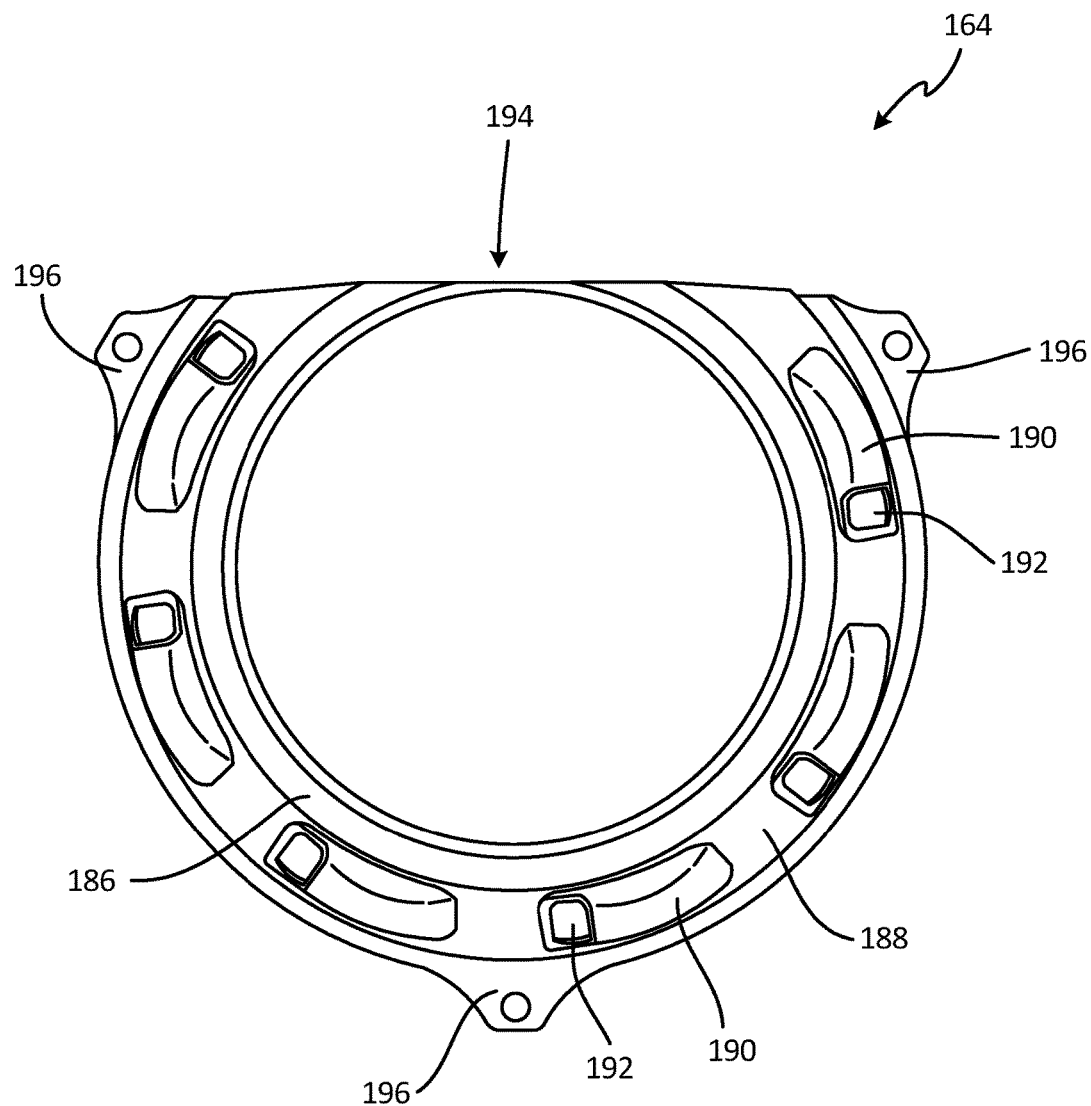
FIG. 6B is a front elevation view of the baffle of FIG. 6A.

FIG. 6A is a perspective view of a portion of geared system 58 with another embodiment of a baffle, and FIG. 6B is a front elevation view of the baffle of FIG. 6A. The portion of geared system 58 includes high speed shaft 38 with first gear 60 having first set of gear teeth 70 (which includes first meshed subset 78A and first unmeshed subset 78B (hidden behind baffle 164 in FIG. 6A)). Gear system 58 also includes second set of gear teeth 76 (which includes second meshed subset 80A and second unmeshed subset 80B) and baffle 164. Baffle 164 includes ring 186, rim 188, a plurality of pockets 190, a plurality of slots 192, window 194, and flanges 196.

Baffle 164 has the same functionality as baffle 64 of FIGS. 2-5C, but baffle 164 is configured to surround first gear 60 and more particularly, to surround first unmeshed subset 78B of first set of gear teeth 70. However, instead of including a disk at a middle (such as disk 86 in baffle 64), baffle 164 includes ring 186 with an aperture that is configured to allow a shaft, such as low speed shaft 37, to extend through baffle 164. While baffle 164 is shown adjacent to first gear 60, baffle 164 can be oriented and configured so as to be adjacent to second gear 76 to surround second unmeshed subset 80B of second set of gear teeth 76.

Ring 186 is connected to and within rim 188 to provide structural support to rim 188. Ring 186 aids in surrounding and shielding first unmeshed subset 78B from lubricant that is churning or otherwise moving around the mid-bearing compartment in which gear system 58 of transmission system 54 is located. Ring 186 can be flat such that the entire ring 186 is in one plane, can be angled inward so that an inner edge of ring 186 is closer to first gear 60 than an outer edge (which is connected to rim 188), or can have a lip or stair-stepped configuration to better surround first gear 60, low speed shaft 37, high speed shaft 38, or other components. Further, baffle 164 does not need to include ring 186 and can be configured to include only rim 188.

Rim 188 is radially outward from ring 186. Rim 188 of baffle 164 is similar in configuration and functionality to rim 88 of baffle 64. However, rim 188 is positioned and oriented to surround and cover first unmeshed subset 78B of first set of gear teeth 70, and rim 188 includes flanges 196 that allow for baffle 164 to be attached to a support structure to keep baffle 164 stationary in relation to first gear 60. Flanges 196 can have any shape or configuration, can include one or multiple holes that are configured to accommodate bolts, rivets, or other fasteners or can have other attachment means, such as ridges, mounds, or a surface that is able to be welded, brazed, and/or glued. Additionally, while FIGS. 6A and 6B show baffle 164 having three flanges 196, baffle 164 can have any number of flanges 196 or can be configured to have no flanges 196 and instead attach to a support structure another way.

As with rim 88 of baffle 64, rim 188 of baffle 164 includes window 194. Window 194 is adjacent to an area where first gear 60 meshes with second gear 62 so that rim 188 does not cover first meshed subset 78A of first set of gear teeth 70 (i.e., leaves first meshed subset 78A uncovered and exposed so as to be able to mesh with second meshed subset 80A without contacting second gear 62). In this manner, rim 188 is operable to enable a lubrication system, such as nozzle 82 shown in FIG. 2, to direct lubricant onto first set of gear teeth 70 and/or second set of gear teeth 76 just prior to and/or at the area where those gear teeth mesh with one another. Window 194 is sized and shaped such that a portion of first gear 60 (the portion that includes first meshed subset 78A) may extend radially through window 194 and mesh with second gear 62. Window 194 is also sized and shaped to enable nozzle 82 to direct lubricant onto first set of gear teeth 70 and second set of gear teeth 76. However, rim 188 is operable to substantially prevent first unmeshed subset 78B of first set of gear teeth 70 from being impinged by or otherwise receiving additional lubricant that is churning or otherwise moving around the mid-bearing compartment in which gear system 58 of transmission system 54 is located. Such additional lubricant, if allowed to impinge first unmeshed subset 78B of first set of gear teeth 70, may increase first gear 60 windage and thereby decrease efficiency of transmission system 54 and, thus, gas turbine engine 10 due to contact between the lubricant and first gear 60.

Rim 188 includes a plurality of pockets 190 and a plurality of slots 192 adjacent to the plurality of pockets 190. The plurality of pockets 190 and the plurality of slots 192 of baffle 164 have the same configuration and functionality as those of baffle 64, with each of the plurality of slots 192 being adjacent to one of the plurality of pockets 190. Each of the plurality of pockets 190 is an indent or depression on an inner side of rim 188 (i.e., adjacent first unmeshed subset 78B of first set of gear teeth 70) that is configured to collect lubricant that is expelled from first set of gear teeth 70 due to the rotation of first gear 60. The lubricant expelled from first set of gear teeth 70 is provided to first set of gear teeth 70 by nozzle 82 to cool first gear 60 and reduce friction between first meshed subset 78A and second meshed subset 80A. The lubricant that is collected in the plurality of pockets 190 can escape the plurality of pockets 190 and a space between first set of gear teeth 70 and the inner side of rim 188 through the plurality of slots 192.

Each of the plurality of slots 192 is adjacent to one of the plurality of pockets 190, and each of the plurality of pockets 190 and the plurality of slots 192 can be sized and shaped to allow a sufficient amount of lubricant to be collected and to escape the space between first set of gear teeth 70 and the inner side of rim 188. Also, the plurality of slots 192 are sized and shaped to prevent the lubricant churning or otherwise moving around the mid-bearing compartment from flowing in through the plurality of slots 192 to impinge first set of gear teeth 70. In the disclosed embodiments, the plurality of slots 192 each have an oblong shape with a side of each of the plurality of slots 192 coinciding with a side of one of the plurality of pockets 190. Each of the plurality of pockets 190 can be sized and shaped to collect a desired amount of lubricant expelled from first set of gear teeth 70 due to rotation of first gear 60, with each of the plurality of pockets 190 being upstream from a corresponding slot 192 (with upstream meaning rotationally upstream as measured by a rotation of first gear 60). However, each of the plurality of pockets 190 can be downstream from a corresponding slot 192 if design requires.

As shown in the disclosed embodiments, the plurality of pockets 190 are each a depression formed by a wall of rim 188 extending away from first gear 60 such that a distance between first set of gear teeth 70 and rim 188 is larger at the plurality of pockets 190 than a distance between first set of gear teeth 70 and the inner side of rim 188. Each of the plurality of pockets 190 can gradually get deeper the closer each pocket 190 gets to the corresponding slot 192 so that lubricant can easily flow out of the plurality of pockets 190 through the plurality of slots 192. However, each of the plurality of pockets 190 can have other configurations, such as a pocket that is rectangular with one consistent depth, a pocket that has a lip on the side of the pocket that is adjacent to the corresponding slot 192, a pocket that has channels on a bottom, or a pocket that has walls that gradually transition from rim 188 to the bottom of pocket 190. While the disclosed embodiments show the plurality of pockets 190 having a length (measured in a circumferential direction) that is greater than a length of a corresponding slot 192, each of the plurality of slots 192 can have a length that is greater than a length of a corresponding pocket 190. Further, each of the plurality of pockets 190 can have a different length than adjacent pockets 190. The disclosed embodiments show baffle 164 having six pockets 190 along with six slots 192, but other embodiments can include any number of pockets 190 and slots 192, depending on design considerations and the amount of lubricant applied to first gear 60 and second gear 62 and the amount of lubricant within the mid-bearing compartment in which transmission system 54 is located.

If desired, geared system 58 of transmission system 54 can include both baffle 64 that surrounds second gear 62 and baffle 164 that surrounds first gear 60. Baffle 64 and baffle 164 can be configured to shield both second gear 62 and first gear 60, respectively, from impingement caused by lubricant churning or otherwise moving around the mid-bearing compartment. Further, baffle 64 with the plurality of pockets 90 and the plurality of slots 92 and baffle 164 with the plurality of pockets 190 and the plurality of slots 192 are configured to allow lubricant that is trapped between second gear 62 and the inner side of rim 88 and between first gear 60 and the inner side of rim 188 to escape, further reducing impingement on first gear 60 and second gear 62. The reduction of impingement and the reduction of churning of lubricant on first gear 60 and second gear 62 increases efficiency of gas turbine engine 10 because such motion of the lubricant causes the lubricant to increase in temperature, resulting in gas turbine engine 10 expending more energy operating heat exchangers within gas turbine engine 10 to reduce the temperature of the lubricant before the lubricant is recycled through gas turbine engine 10. Also, impingement and churning of lubricant on first gear 60 and second gear 62 reduces the rotational efficiency of the gears (and thus reduces the efficiency of gas turbine engine 10) because the gears face increased resistance from lubricant that is impacting each of first gear 60 and second gear 62. Thus, the presence of the plurality of pockets 90 and 190 and the plurality of slots 92 and 192 in baffle 64 and 164, respectively, is beneficial to allow lubricant to be removed from second gear 62 and first gear 60, respectively.

Discussion of Possible Embodiments

The following are non-exclusive descriptions of possible embodiments of the present invention.

An assembly can include a first gear with a first set of gear teeth, a second gear with a second set of gear teeth that mesh with the first set of gear teeth, and a baffle surrounding a subset of the second set of gear teeth. The baffle has a plurality of pockets adjacent to the subset of the second set of gear teeth and a plurality of slots adjacent to the plurality of pockets with the plurality of slots extending through the baffle.

The assembly of the preceding paragraph can optionally include, additionally and/or alternatively, any one or more of the following features, configurations and/or additional components:

The baffle is stationary and each of the plurality of pockets is rotationally forward of a corresponding slot of the plurality of slots in relation to a rotation of the second gear.

Each pocket of the plurality of pockets gradually gets deeper in a rotationally downstream direction to be deepest at a point adjacent to each corresponding slot of the plurality of slots.

The baffle has a frustoconical portion adjacent to an inner side of the second gear and a cover connected to the frustoconical portion with the cover having the plurality of pockets and the plurality of slots adjacent to the subset of the second set of gear teeth.

An arm connected to the frustoconical portion of the baffle and configured to keep the baffle stationary relative to the second gear.

The baffle has a rim with a hollow frustoconical shape that surrounds a subset of the second gear teeth and is configured to accommodate a shaft extending through the baffle.

At least one flange connected to the rim.

The baffle includes a window adjacent to the first gear, the window configured to prevent the baffle from coming into contact with the first gear.

A second baffle surrounding a subset of the first set of gear teeth on the first gear, the second baffle having a second plurality of pockets adjacent to the subset of the first set of gear teeth and a second plurality of slot adjacent to the second plurality of pockets with the second plurality of slots extending through the second baffle.

A shaft attached at a first end to the second gear and at a second end to a gearbox.

A shaft attached to the second gear, the shaft being a high speed shaft in a gas turbine engine.

A nozzle configured to apply lubricant to the second set of gear teeth.

The plurality of pockets includes at least three pockets and the plurality of slots includes at least three slots.

A baffle can include a rim having a frustoconical shape, multiple pockets on an inner side of the rim configured to collect lubricant, and multiple slots extending through the rim with each slot of the multiple slots being adjacent to a corresponding pocket of the multiple pockets and configured to allow lubricant to flow through the rim.

The baffle of the preceding paragraph can optionally include, additionally and/or alternatively, any one or more of the following features, configurations and/or additional components:

A disk connected to and within the rim, the disk having an attachment area configured to allow the baffle to attach to a support structure.

A flange connected to and extending outward from the rim, the flange having an attachment area configured to allow the baffle to attach to a support structure.

Each pocket of the multiple pockets gets deeper as the pocket gets closer to the corresponding adjacent slot of the multiple slots.

A ring connected to and within the rim, the ring having an aperture at a center that is configured to allow a shaft to extend through the ring and the baffle.

The multiple pockets includes at least four pockets and the multiple slots includes at least four slots.

Each pocket of the multiple pockets has a greater length than a length of each slot of the multiple slots.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a first gear with a first set of gear teeth;
   a second gear with a second set of gear teeth that mesh with the first set of gear teeth; and
   a baffle surrounding a subset of the second set of gear teeth, the baffle having a plurality of pockets adjacent to the subset of the second set of gear teeth and a plurality of slots adjacent to the plurality of pockets with the plurality of slots extending through the baffle, wherein each of the plurality of pockets includes three walls that are attached to the baffle to form each pocket configured to collect lubricant and a side adjacent a corresponding slot of the plurality of slots configured to allow lubricant to escape the corresponding pocket of the plurality of pockets.

2. The assembly of claim 1, wherein the baffle is stationary and each of the plurality of pockets is rotationally forward of a corresponding slot of the plurality of slots in relation to a rotation of the second gear.

3. The assembly of claim 2, wherein each pocket of the plurality of pockets gradually gets deeper in a rotationally downstream direction to be deepest at a point adjacent to each corresponding slot of the plurality of slots.

4. The assembly of claim 1, wherein the baffle has a frustoconical portion adjacent to an inner side of the second gear and a cover connected to the frustoconical portion with the cover having the plurality of pockets and the plurality of slots adjacent to the subset of the second set of gear teeth.

5. The assembly of claim 4, further comprising:
   an arm connected to the frustoconical portion of the baffle and configured to keep the baffle stationary relative to the second gear.

6. The assembly of claim 1, wherein the baffle has a rim with a hollow frustoconical shape that surrounds a subset of the second gear teeth and is configured to accommodate a shaft extending through the baffle.

7. The assembly of claim 6, further comprising:
   at least one flange connected to the rim.

8. The assembly of claim 1, wherein the baffle includes a window adjacent to the first gear, the window configured to prevent the baffle from coming into contact with the first gear.

9. The assembly of claim 1, further comprising:
   a second baffle surrounding a subset of the first set of gear teeth on the first gear, the second baffle having a second plurality of pockets adjacent to the subset of the first set of gear teeth and a second plurality of slot adjacent to the second plurality of pockets with the second plurality of slots extending through the second baffle.

10. The assembly of claim 1, further comprising:
    a shaft attached at a first end to the second gear and at a second end to a gearbox.

11. The assembly of claim 1, further comprising:
    a shaft attached to the second gear, the shaft being a high speed shaft in a gas turbine engine.

12. The assembly of claim 1, further comprising:
    a nozzle configured to apply lubricant to the second set of gear teeth.

13. The assembly of claim 1, wherein the plurality of pockets includes at least three pockets and the plurality of slots includes at least three slots.

14. A baffle comprising:
    a rim having a frustoconical shape;
    multiple pockets on an inner side of the rim configured to collect lubricant with each pocket having three walls attached to the rim to form each indented pocket; and
    multiple slots extending through the rim, each slot of the multiple slots being adjacent to a corresponding pocket of the multiple pockets and configured to allow lubricant to flow through the rim.

15. The baffle of claim 14, further comprising:
    a disk connected to and within the rim, the disk having an attachment area configured to allow the baffle to attach to a support structure.

16. The baffle of claim 14, further comprising:
    a flange connected to and extending outward from the rim, the flange having an attachment area configured to allow the baffle to attach to a support structure.

17. The baffle of claim 14, wherein each pocket of the multiple pockets gets deeper as the pocket gets closer to the corresponding adjacent slot of the multiple slots.

18. The baffle of claim 14, further comprising:
   a ring connected to and within the rim, the ring having an aperture at a center that is configured to allow a shaft to extend through the ring and the baffle.

19. The baffle of claim 14, wherein the multiple pockets includes at least four pockets and the multiple slots includes at least four slots.

20. The baffle of claim 14, wherein each pocket of the multiple pockets has a greater length than a length of each slot of the multiple slots.

* * * * *